Figure 1:
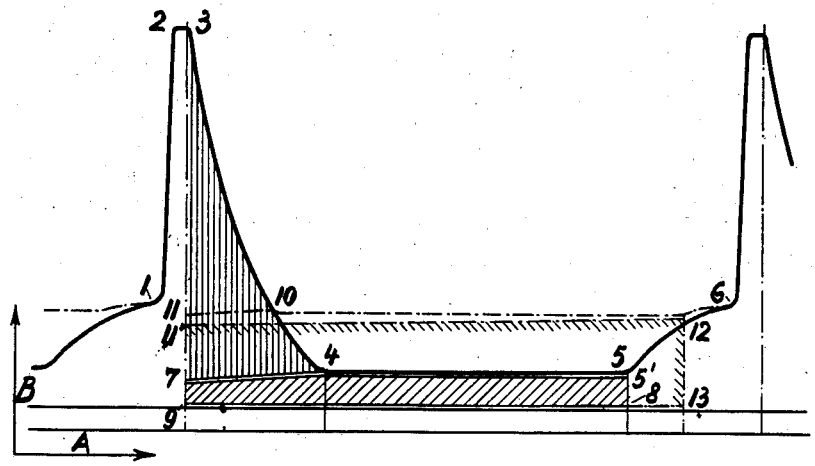

Aug. 13, 1935.  W. G. NOACK  2,010,823
METHOD OF AND APPARATUS FOR SUPERCHARGING EXPLOSION CHAMBERS
Filed Dec. 11, 1931  2 Sheets-Sheet 1

INVENTOR
WALTER G. NOACK
BY
ATTORNEY

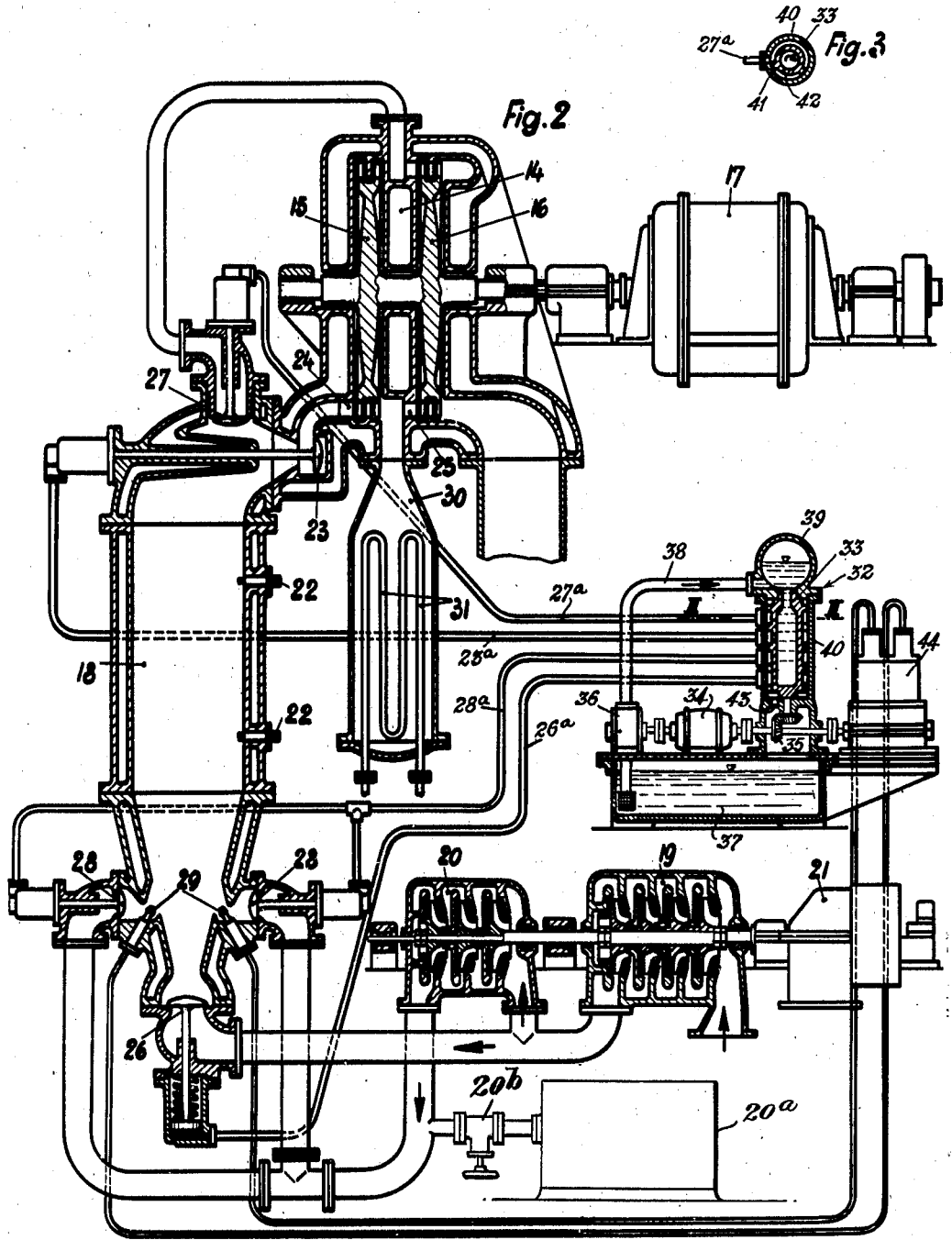

Patented Aug. 13, 1935

2,010,823

UNITED STATES PATENT OFFICE 2,010,823

METHOD OF AND APPARATUS FOR SUPER-CHARGING EXPLOSION CHAMBERS

Walter Gustav Noack, Baden, Switzerland, assignor to The Holzwarth Gas Turbine Company, San Francisco, Calif., a corporation of Delaware Application December 11, 1931, Serial No. 580,318
In Germany December 11, 1930

5 Claims. (Cl. 60—41)

My invention relates to an improved method of and apparatus for supercharging with high pressure air the constant volume explosion chambers of explosion gas turbines wherein driving gases of high pressure are generated by the explosion of successive charges of air and fuel.

It is known to compress the air or the fuel-air mixture which is to be used in gas turbine plants of the constant volume, i. e. explosion type in special compressors and to charge the same at rather high pressure into the explosion chambers of such plants in order to obtain higher explosion pressures by such pre-compression. The expansion of the working gases then occurs either in a nozzle directly to atmospheric counter-pressure, or such gases are expanded in a number of stages, the initial expansion taking place in the first nozzle down to a counter-pressure which is generally equal to the pre-compression or charging pressure. In the latter case the expansion down to atmospheric pressure then occurs in subsequent turbine stages, which on account of the rapid succession of discharges from the explosion chambers and because of the equalizer action of a large exhaust chamber after the first turbine, are continuously impinged by a stream of gas. If the displacement (scavenging) of the residual gases remaining in the explosion chambers following the expansion and discharge of the explosion gases is accomplished, as has already been proposed, with the same air which serves to support the combustion in the chamber, or if, in other words, the same pressure is chosen for the pre-compression of the fuel and air as for the scavenging, then either the compression pressure must be kept low if too much work is not to be expended on compression, or, if high compression pressures are employed, the economy of the whole plant suffers since high compression requires a great expenditure of energy, much space, and high initial cost. Furthermore, if a pressure equal to the charging pressure is selected as the counter pressure of the first turbine rotor, then there remains for utilization in the first rotor (the actual explosion turbine) only the rapidly diminishing pressure drop which is created by the explosion, while the second turbine must work with the residual pressure drop which, with higher charging pressure, is much greater. Such procedure thus also produces a fall in the efficiency because of the temperature reduction required by the first rotor and the high energy expenditure required by the high compression.

It is the object of the present invention to overcome these disadvantages and provide an arrangement wherein high explosion pressures are obtained accompanied by a high output in the first or explosion turbine while scavenging is effected in an efficient and economical manner. According to the present invention, which relates to a gas turbine plant of the constant volume explosion type including at least two rotors arranged in series, the charging of air into the explosion chamber or chambers is accomplished in at least two steps in such a manner that first the residual gases are expelled from the chamber with air of lower pressure, and the chamber thus pre-charged with air of approximately the pressure of the exhaust of the first turbine, after which, the nozzle (exhaust) valve of the chamber being closed, the chamber is super-charged with air of a higher pressure, preferably at least double that of the initial charge of air. As in this manner only a part of the air needs be compressed to a high pressure, air of only a comparatively low pressure being required for displacing the residual gases for the scavenging of the chamber the power required for compression is reduced very considerably. The dimensions of the use of such higher pressures, the dimensions of the explosion chambers and of the first rotor are nevertheless small and the explosion pressures are high as the final supercharging pressure, which alone determines the explosion pressure, is likewise high. The available pressure drop in the first rotor thus comprises a pressure which is the sum of the pressure difference between the scavenging and supercharging pressures and the pressure rise above the supercharging pressure produced by the explosion. The supercharging of the chamber thus makes it possible to apportion the major part of the work to the first rotor, and the temperature at such rotor is much lower than heretofore when only the additional pressure produced by the explosion was available for the expansion of the gases and for the accompanying temperature reduction before they reached the first rotor.

The invention will be further explained with the aid of the accompanying drawings, wherein Fig. 1 represents a pressure-time diagram of an explosion chamber operated according to my improved method; while Fig. 2 represents diagrammatically an explosion turbine plant embodying the present invention. Fig. 3 shows a section through the pressure oil distributor along the line III—III of Fig. 2.

The abscissæ A in Fig. 1 represent time while the ordinates B represent pressure. At I the compressed fuel and air mixture in the chamber is ignited and explodes to the pressure 2. After a short interval for insuring complete combustion, the nozzle (exhaust) valve is opened at 3 and the gases are directed upon the rotor where they perform work. The gases reach the counter-pressure (pressure at the first rotor) at 4. According to the invention, this pressure 4 is considerably lower than the pressure which prevails in the explosion chamber at the moment of ignition 1. The residual gases can thus be driven out of the chamber with correspondingly lower pressure air and the chamber pre-charged with low pressure air up to approximately the point 5. At this instant the nozzle valve is closed and likewise the low pressure air inlet valve, whereupon the further filling or supercharging of the chamber with higher pressure air takes place with the aid of a separate super-charging valve, until the full super-charging pressure is reached as indicated at 6. The output of the first rotor is indicated by the surface 3—4—7 (the abscissæ, as stated, representing time) the line 7—4 showing the counter-pressure at the first rotor. The work done by the next rotor or rotors is indicated by the surface 7—5'—8—9, wherein the line 8—9 is the atmospheric counter-pressure.

For the sake of comparison there is shown in Fig. 1 in dot-dash lines the counter-pressure and scavenging pressure lines of the prior method of operation of compound gas turbines of the type above referred to, wherein higher counter pressures and higher scavenging air pressure were employed. The discharge of the explosion gases, in view of the higher counter-pressure, ends at the instant 10. The expulsion of the residual gases proceeds at approximately uniform pressure up to the end of the cycle as shown at 6. No supercharging of the chamber with higher pressure air takes place. The working surface of the first motor is reduced to the surface 3—10—11 while the working surface of the subsequent rotor or rotors is increased to a surface 11'—12—13—9.

The temperature of the gases in advance of the nozzles of the second rotor is approximately equal to the temperature at the blades of the first rotor. This temperature is limited by the strength and heat resistance of the structural material. As the so-called "available", that is, work-producing, pressure drop depends upon the temperature, and indeed upon the absolute temperature of the driving gases, and the pressure of the driving gases must be produced by the compressor, then it is evident that it is useless and uneconomical to maintain the pressure in advance of the second nozzle too high. In fact, the greatest economy is secured when this pressure is not higher than that which can be obtained by a simple, if desired uncooled, turbo-compressor, and it produces such an "available pressure drop" that the latter can be utilized in a single rotor which operates with a favorable ratio of peripheral velocity $u$ to motive fluid velocity $c$. These ratios for the practical case prevail at a pressure at the first rotor at about 2.5 to 3.5 atmospheres absolute, while with my improved super-charging process considerably higher, for example, 6 to 10 atmospheres absolute, can be reached.

For the compression of the smaller quantity of super-charging air a piston compressor or a rotary (rotary piston) compressor may with advantage be employed, such compressor receiving pre-compressed cooled air, so that its suction volume and the super-charging compression work are small. Such compressors are shown and described in detail in "Kolben- und Turbocompressoren' by P. Ostertag, 3rd ed., Julius Springer, Berlin, 1923, pages 108 to 131, Figs. 99 to 153, and page 139, Figs. 168, 169. The super-charger feeds into a container 20a at constant pressure, in which case the pressure difference between the uniform container pressure and the gradually increasing combustion chamber pressure is utilized to charge the fuel into the chambers, and to atomize the same in the case of heavy oil, coal dust, etc. The container 20a may be controlled by a valve 20b.

In the explosion turbine plant shown in Fig. 2, the numeral 14 indicates the actual gas turbine which, as illustrated, is a compound turbine composed, for example, of two rotors 15 and 16 arranged one behind the other and coupled to a generator 17 for driving the latter. The explosion chamber is shown at 18, the driving medium being generated in such chamber by the explosion of air and fuel. 19 and 20 are the two cylinders of a compressor which is driven, for example, by a steam turbine 21. The improved mode of operation of the plant illustrated is as follows:

It is assumed that the chamber 18 is charged with a compressed fuel and air mixture which is ignited by the spark plugs 22. The nozzle or exhaust valve 23 is opened with the aid of the explosion gas pressure, so that the high pressure gases reach the nozzle 24 and are directed by the latter against the rotor 15. The gases give up a part of their energy by expanding to the exhaust pressure of the rotor 15, while the remaining available energy is utilized in the rotor 16 after expansion in the nozzle 25 to atmospheric pressure.

The explosion chamber 18 (or the several explosion chambers, as two or more chambers may be employed in association with the rotor 15) is charged with air in at least two steps, the compressor or compressors supplying air of different pressures. The air of lower pressure, which is supplied by the cylinder 19, is employed to expel the residual gases from the explosion chamber 18. As soon as the explosion gases have expanded in the explosion chamber to approximately the exhaust pressure of the rotor 15, the nozzle valve 23 is closed by any suitable operating or timing mechanism, such as a hydraulic distributor 32 of the type illustrated in the patents to Hans Holzwarth, Nos. 877,194 and 1,763,154, as will be described below. This scavenging air enters the chamber through the valve 26, the residual gases leaving the chamber through the auxiliary exhaust valve 27, from which the gases pass to any suitable place of use, for example, to the second rotor 16 to perform work with the available energy contained therein. The explosion chamber is preferably of elongated form and is provided with a conical inlet portion, as illustrated, and the relationship between the scavenging air pressure and the exhaust pressure of the rotor 15 is so chosen that the entering current of scavenging air assumes the form of a piston and drives the residual gases before it without mingling with them to any considerable extent, so that the auxiliary exhaust valve may be closed as soon as the advanced portion of scavenging air reaches the same and the loss of air through the valve thereby avoided. When the residual gases are expelled from the chamber and the latter simultaneously filled with combustion supporting air of low pressure, the two valves 26 and 27 are closed, whereupon the supercharging of the chamber with air and fuel of higher pressure begins. The higher pressure air is supplied by the second stage 20 of the compressor and is introduced into the chamber through separate super-charging valves 28. The fuel nozzles 29 are arranged in the path of the high pressure air, the fuel being introduced by the nozzles in a state of fine sub-division. In the construction illustrated, the fuel nozzles are designed to charge oil, appropriate charging devices being provided when gas or coal dust is employed as fuel. The pressure at which the super-charging air is blown into the chamber is considerably higher than the pressure of the scavenging air which prevails in the chamber at the beginning of the supercharging, the supercharging air pressure being preferably at least twice the scavenging pressure; in other words, as the explosion pressure is a controlling factor for the capacity and efficiency of the plant, the air employed to expel the residual gases and to precharge the chamber should have less than half of the super-charging pressure which determines the explosion pressure. The reason for this relationship, as mentioned above, lies in the fact that by this measure a greater degree of expansion of the hot explosion gases in the chamber, and thereby a greater output, are obtained, and above all a lower temperature at the first rotor, so that the gases which strike the second rotor need not be cooled at all or only to a small degree. To effect such cooling there is provided in the embodiment of the invention illustrated in Fig. 2, a receiver 30 in which coils 31 are located which may serve, for example, as superheaters for steam generated in any suitable manner from the waste heat of the plant. The maintenance of a low end pressure for the first expansion also facilitates the scavenging of the chamber and favors the formation of a better mixture of fuel and air. The main advantage, however, lies in the lower compressor work, as the greater part of the air need be compressed to only a low pressure, which can be effected with good efficiency, while the quantity of air which is to be brought to a higher supercharging pressure for attaining higher explosion pressure is comparatively small.

The hydraulic distributor 32 referred to above comprises a hollow rotatable cylinder 33 driven at a uniform rate of speed by a motor 34 through gearing 35. The motor may also drive a pump 36 which sucks oil from a supply tank 37 and feeds such oil under pressure through a pipe 38 into the interior of the cylinder by way of an air chamber 39. The cylinder is positioned within and spaced radially from a stationary cylindrical casing 40, the space between the cylinder and casing being divided into as many separate annular chambers as there are valves or other members to be controlled. Each annular chamber is provided with blocks or partitions 41 which divide the chamber into two arcuate channels, one of which communicates through a port 42 with the interior of the cylinder and hence is constantly supplied with oil under pressure; while the other channel is constantly in communication with a space of low or exhaust pressure, as with the supply tank 37 through the port 43. The channels are so dimensioned and arranged that they communicate in properly timed sequence with the pipes 23a, 26a, 27a, and 28a to charge oil under pressure to the piston cylinders connected with the controlled valves, or to relieve such pipes of such oil pressure and permit the valves to be returned to their original position by means of their springs.

The motor 34 may be arranged to drive also a fuel pump 44 of any suitable and known construction, such as that disclosed in Fig. 197 on page 188 of "Oel- und Gasmaschinen" by Professor Heinrich Dubbel, published by J. Springer, Berlin, 1926. The pump periodically charges fuel under pressure to the nozzles 29 by way of the conduits 45.

I claim:

1. The improvement in the art of operating a compound explosion turbine having a constant volume explosion chamber provided with a valve-controlled outlet, which comprises maintaining a back pressure considerably above atmospheric on the explosion chamber, opening the valved outlet following an explosion to discharge the pressure gases from the chamber, charging compressed air into such chamber at a pressure only sufficiently above the back pressure to insure rapid expulsion of the residual gases in the chamber when an exploded charge has expanded to approximately such air pressure while the outlet remains open and simultaneously pre-charging the chamber with such compressed air, conducting the expelled residual gases into a turbine stage subsequent to the first for utilization of its heat and pressure energy therein, then closing the outlet valve and introducing air of an ignition pressure at least about double that of the initial charge of air to super-charge the chamber with highly compressed air, whereby such chamber is scavenged with air of a pressure approximately equal to the back pressure, but is filled with air of considerably higher pressure for the explosion.

2. In a compound gas turbine, the combination of a constant volume explosion chamber, air charging mechanism and fuel charging mechanism at the inlet side of said chamber, a plurality of gas turbine stages arranged in series, a nozzle arranged to direct the high pressure explosion gases discharging from said chamber into the first turbine stage, a conduit leading from the outlet end of the chamber to a subsequent turbine stage, outlet mechanism at the outlet side of said chamber adapted to be opened after an ignition to discharge the high pressure gases into said nozzle and thereafter to discharge the residual gases into said conduit, a source of compressed air of low pressure, means for feeding such air of low pressure to said air charging mechanism for introduction into said chamber while the outlet mechanism is open and after the high pressure gases have been discharged from the chamber to cause the residual gases to be discharged through said conduit by such air, a source of compressed air of considerably higher pressure than said first-mentioned air, and means for feeding said higher pressure air to said air charging mechanism for introduction into said chamber while the outlet mechanism is closed to create a pressure in such chamber considerably above the exhaust pressure of the first rotor prior to the ignition of the charge in the chamber.

3. The combination as set forth in claim 2, wherein said outlet mechanism comprises two separate valves, one for the high pressure explosion gases and the other for the residual gases.

4. The combination of a constant volume explosion chamber, air charging mechanism and fuel charging mechanism at the inlet side of said chamber, a plurality of explosion gas operated devices arranged in series, means arranged to direct the high pressure explosion gases discharging from said chamber into the first device, a conduit leading from the outlet end of the chamber to a subsequent device operating at a lower pressure then the first device, outlet mechanism at the outlet side of said chamber adapted to be opened after an ignition to discharge the high pressure gases into said means and thereafter to discharge the residual gases into said conduit, a source of compressed air of low pressure, means for feeding such air of low pressure to said air charging mechanism for introduction into said chamber while the outlet mechanism is open and after the high pressure gases have been discharged from the chamber to cause the residual gases to be discharged through said conduit by such air, a source of compressed air of considerably higher pressure than said first-mentioned air, and means for feeding said higher pressure air to said air charging mechanism for introduction into said chamber while the outlet mechanism is closed to create a pressure in such chamber considerably above the exhaust pressure of the first device prior to the ignition of the charge in the chamber.

5. The improvement in the art of operating a power plant having a constant volume explosion chamber provided with a valve-controlled outlet and including a plurality of explosion gas operated devices arranged in series, which comprises maintaining a back pressure considerably above atmospheric on the explosion chamber, opening the valved outlet following an explosion to discharge the pressure gases from the chamber, charging compressed air into such chamber at a pressure only sufficiently above the back pressure to insure rapid expulsion of the residual gases in the chamber when an exploded charge has expanded to approximately such air pressure while the outlet remains open and simultaneously pre-charging the chamber with such compressed air, conducting the expelled residual gases into a device subsequent to the first device for utilization of its heat and pressure energy therein, then closing the outlet valve and introducing air of an ignition pressure at least about double that of the initial charge of air to supercharge the chamber with highly compressed air, whereby such chamber is scavenged with air of a pressure approximately equal to the back pressure, but is filled with air of considerably higher pressure for the explosion.

WALTER GUSTAV NOACK.